US012409099B2

(12) United States Patent
Von Buttlar

(10) Patent No.: US 12,409,099 B2
(45) Date of Patent: Sep. 9, 2025

(54) MASSAGE TOY FOR SEXUAL STIMULATION

(71) Applicant: RABAN & FAMILIE PROJEKT—UND BETEILIGUNGS UG (HAFTUNGSBESCHRÄNKT), Berlin (DE)

(72) Inventor: Raban Von Buttlar, Potsdam (DE)

(73) Assignee: RABAN & FAMILIE PROJECT—UND BETEILIGUNGS UG, Berlin (DE)

( * ) Notice: Subject to any disclaimer, the term of this patent is extended or adjusted under 35 U.S.C. 154(b) by 935 days.

(21) Appl. No.: 17/440,822

(22) PCT Filed: Mar. 22, 2020

(86) PCT No.: PCT/EP2020/057902
§ 371 (c)(1),
(2) Date: Sep. 20, 2021

(87) PCT Pub. No.: WO2020/193444
PCT Pub. Date: Oct. 1, 2020

(65) Prior Publication Data

US 2022/0168174 A1 Jun. 2, 2022

(30) Foreign Application Priority Data

Mar. 22, 2019 (EP) .................................... 19164709

(51) Int. Cl.
*A61H 19/00* (2006.01)

(52) U.S. Cl.
CPC ..... *A61H 19/32* (2013.01); *A61H 2201/1215* (2013.01); *A61H 2201/1676* (2013.01); *A61H 2201/5007* (2013.01)

(58) Field of Classification Search
CPC ........ A61H 19/00; A61H 19/30; A61H 19/32; A61H 19/50; A61H 23/0254; A61H 23/0263
See application file for complete search history.

(56) References Cited

U.S. PATENT DOCUMENTS 2,219,138 A 10/1940 Morrison
4,580,553 A * 4/1986 Laib ....................... A61H 19/00 601/102

(Continued)

FOREIGN PATENT DOCUMENTS

CN 106619021 5/2017
WO 2018058234 4/2018

*Primary Examiner* — Carrie R Dorna
(74) *Attorney, Agent, or Firm* — JMB Davis Ben-David

(57) ABSTRACT

The invention relates to a massage toy (1) for stimulation of a sexual organ, the massage toy (1) comprising at least the following components:—A first toy member (11) of the massage toy (1), wherein the first toy member (11) comprises a first rod element (10) extending along a first rotation axis (101), wherein the first rod element (10) is arranged rotatably on the first rotation axis (101);—A second toy member (21) of the massage toy (1), wherein the second toy member (21) comprises a second rod element (20) extending along a second rotation axis (102), wherein the second rod element (20) is arranged rotatably on the second rotation axis (102);—A hinge assembly (2, 2*a*, 2*b*) that connects the first toy member (11) with the second toy member (21) such that the first and the second toy member (11, 21) can be swiveled around a swivel axis (100) of the hinge assembly (2, 2*a*, 2*b*), wherein the hinge assembly (2, 2*a*, 2*b*) is configured to adopt an adjustable swivel angle (300), such that a distance between the first rotation axis (101) and the second rotation axis (102) is adjustable by adjusting the swivel angle (300),—A motor assembly (5, 5*a*) configured to rotate the first rod element (10) around the first rotation (Continued)

Figure 1:
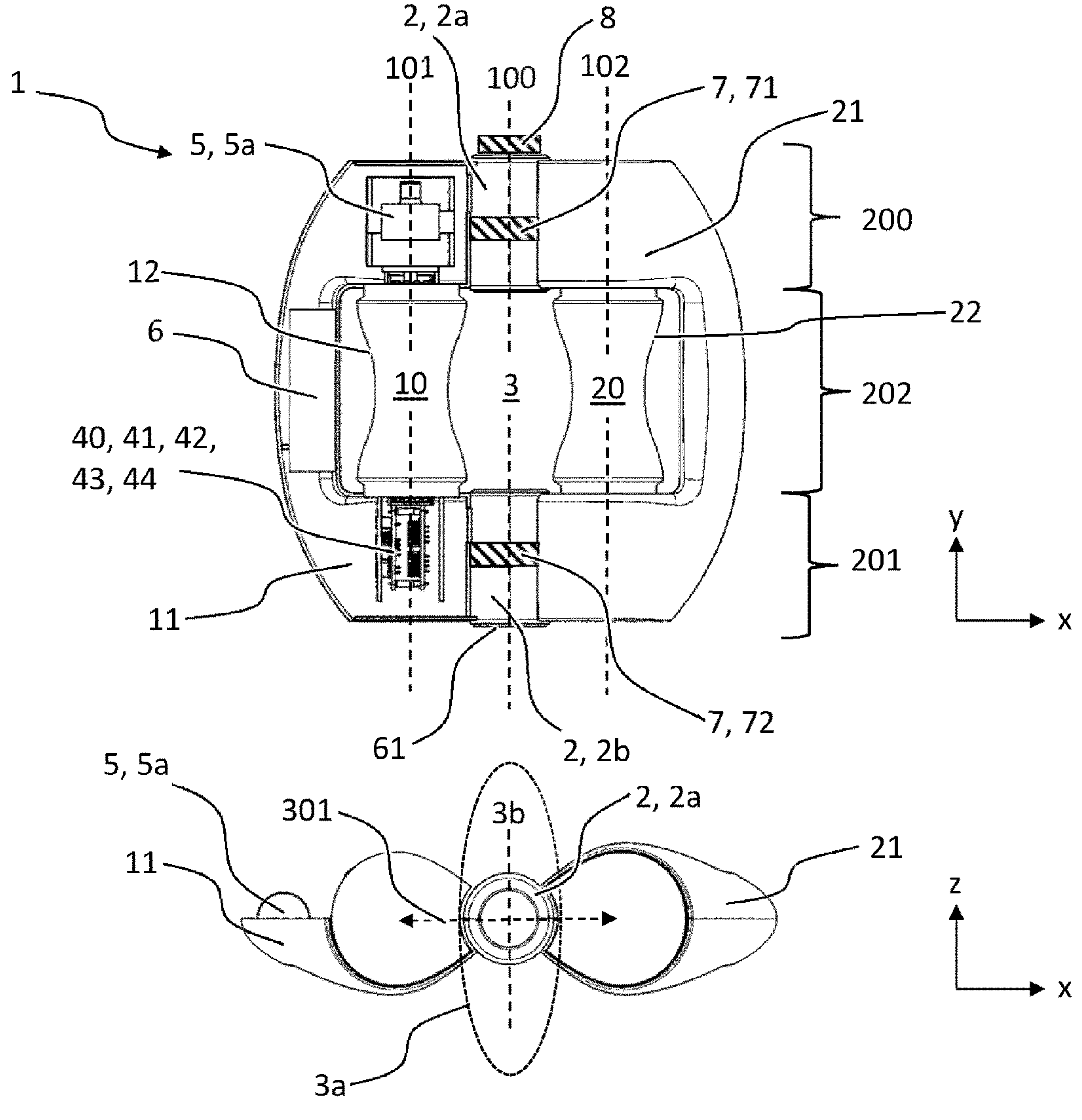
Figure 1:
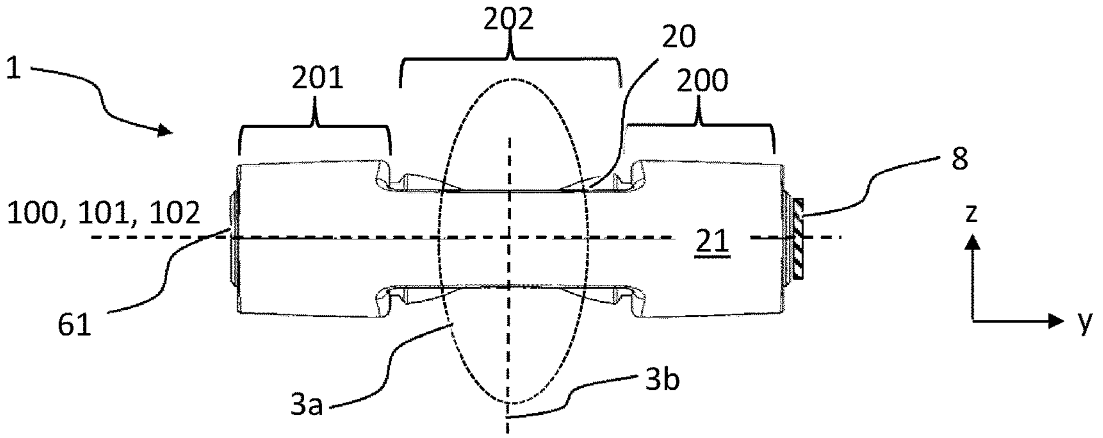
Figure 1:
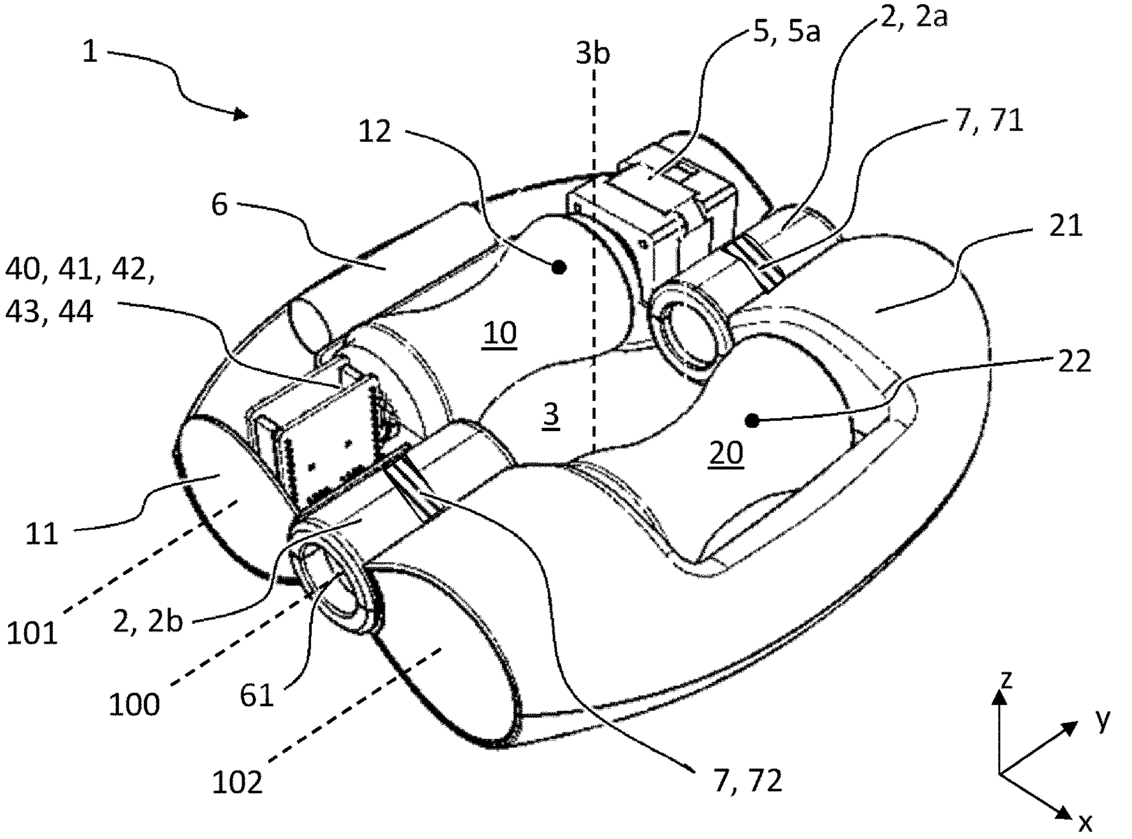

axis (101) and to rotate the second rod element (20) around the second rotation axis (102). The invention further relates to a computer program for operating the massage toy (1).

14 Claims, 8 Drawing Sheets

(56) References Cited

U.S. PATENT DOCUMENTS

| | | | | |
|---|---|---|---|---|
| 4,834,115 | A | 5/1989 | Stewart | |
| 5,997,489 | A * | 12/1999 | Iwamoto | A61H 15/0092 601/119 |
| 2012/0271101 | A1 * | 10/2012 | Tan | A61F 2/50 600/38 |
| 2015/0065792 | A1 | 3/2015 | Levine | |
| 2017/0258456 | A1 * | 9/2017 | Wu | A61H 23/02 |

* cited by examiner

MASSAGE TOY FOR SEXUAL STIMULATION

CROSS-REFERENCE TO RELATED APPLICATIONS

This is the U.S. National Stage of International Patent Application No. PCT/EP2020/057902 filed on Mar. 22, 2020, which in turn claims the benefit of European Patent Application No. 19164709.8 filed on Mar. 22, 2019.

The invention relates to a massage toy for sexual stimulation.

There are a variety of massage toys or sex toys known in the art. These toys have in common that stimulation is achieved by some kind of mechanically induced sensation to the sexual organ such as the penis or the vulva.

With regard to sex toys for men, the toys can be classified in several categories depending on the geometry or their respective stimulation mechanism for the penis.

A first group of toys stimulates the penis by means of friction. Devices of the first group essentially imitate the act of penetration in a body opening and the back and forth motion of the penis. Therefore, devices of this group usually comprise a sleeve made of a soft, washable rubber-like material for imitating the tactile features of the body opening. The sleeve is usually comprised in a cylindrical housing that define a pressure and resistance that is provided by the sleeve to the penis.

All sleeve-like toys have the problem of cleaning and drying. After use, the toy has to be cleaned with water and dried in fresh air. This can force a user to leave the toy lying openly in the apartment for hours in order to dry leading a problem of discretion. In case the sleeve is not thoroughly dried, the user risks grow of mold in the sleeve.

A second group of toys uses electrically induced mechanical vibrations for stimulating the glans. This is achieved by providing a recess made of silicone formed to receive particularly only the glans of a penis. The walls of the recess transmit the mechanical vibrations to the glans for stimulation. A drawback of this second group is that the motors for generating the vibrations can be comparably noisy and that some users do not like this kind of stimulation.

A third group of toys relates to vacuum generation in a silicone made recess formed to receive the glans of the penis. The vacuum pump can be noisy as well and the toy requires a wire connection to mains current. Furthermore, these toys are perceived as being comparably bulky and heavy.

Therefore the problem underlying the invention is to provide a toy that provides an optically appealing design that particularly disguises the nature of the toy. Furthermore, the toy should be easy to clean and handle, avoiding mold growth problems and provide a silent operation.

Furthermore, the toy should provide a novel way of stimulation that is particularly provided in an automated fashion.

This problem is solved by a massage toy for sexual stimulation having the features of claim 1.

Advantageous embodiments are described in the subclaims.

According to claim 1 a massage toy for stimulation of and/or arousing a sexual organ such as a penis or a vulva, comprises at least the following components:

A first toy member of the massage toy, wherein the first toy member comprises a first rod element extending along a first rotation axis, wherein the first rod element is arranged, particularly mounted rotatably on the first rotation axis, particularly wherein the first rod element is configured to be in touch or to be brought in touch with the sexual organ for stimulation;

A second toy member of the massage toy, wherein the second toy member comprises a second rod element extending along a second rotation axis, wherein the second rod element is arranged rotatably on the second rotation axis, particularly wherein the second rod element is configured to be in touch or to be brought in touch with the sexual organ for stimulation;

Particularly only one hinge assembly that connects the first toy member with the second toy member such that the first and the second toy member can be swiveled around a swivel axis of the hinge assembly, wherein the hinge assembly is configured to adopt an adjustable swivel angle, such that a distance between the first rotation axis and the second rotation axis is adjustable by adjusting the swivel angle;

A motor assembly for motor-driven rotation of the first rod element around the first rotation axis and for motor-driven rotation of the second rod element around the second rotation axis.

The first and/or the second rod element are particularly elongated members configured as rollers.

The first and the second toy member are particularly housing parts that are configured to receive and hold the first and the second rod element. The first and the second rod element are particularly arranged such in the first and the second toy member that an outer surface of the first and the second rod element is exposed at least partially to the exterior, i.e. at a least a portion of the outer surface of the first and the second rod element is not covered by a housing or by other parts of the massage toy but particularly directly exposed and visibly to the surrounding.

The first and the second toy member are particularly rigid.

The first and/or the second toy member particularly house the motor assembly.

The term "extending along the first or the second rotation axis" particularly refers to the respective rod element having its center on the rotation axis or parallel to the corresponding rotation axis.

According to another embodiment of the invention, the first and/or the second rod element is/are arranged rotatable around a center of the rod element or the rod element is arranged off-center with respect the rotation axis, wherein in the latter case the first and/or second rod element performs an eccentric motion, when the massage toy is operated.

According to another embodiment of the invention, the first rod element comprises the first rotation axis, particularly wherein the first rotation axis extends through the first rod element.

This allows for centered or eccentric motion of the first rod element around the first rotation axis.

According to another embodiment of the invention, the second rod element comprises the second rotation axis, particularly wherein the second rotation axis extends through the second rod element.

This allows for a centered or an eccentric motion of the second rod element around the second rotation axis.

According to another embodiment of the invention, the first and the second rotation axis enclose an angle with each other that is smaller than 10°, particularly smaller than 5°, more particularly the first and the second rotation axis extend essentially parallel to each other.

According to another embodiment a penetration opening is formed between the first and the second rod element, wherein the penetration opening extends within a plane defined by the first and the second rotation axis. The first and the second rod element are particularly configured to be in touch or to be brought to touch with the sexual organ for stimulation.

By rotating the first and/or the second element around the corresponding rotation axis while being in touch with the sexual organ, e.g. the penis or the vulva, friction on the sexual organ and/or movement of the skin of the sexual organ can be induced and a sexual stimulation is achieved.

The rotation of the first and the second rod element is provided by the motor assembly. The motor assembly and the massage toy therefore comprise components that allow a driving force of the motor assembly to be transmitted to the first and the second rod element, such that a rotational motion of the first and the second rod element is achieved, particularly without any further external elements.

According to another embodiment of the invention, the motor assembly is directly driving a rotation of the first and the second rod element around the first and the second rotation axis. The rotation is around the rotation axis, however, as explained above said rotation is not necessary on center with the rotation axis.

The motor assembly is particularly configured to provide different driving forces to the first and the second rod element, such that for example the rotation speed and direction can differ between the first and the second rod element. Moreover, the motor assembly is particularly configured to provide different torques to the first and the second rod element.

The motor assembly is particularly configured to provide independent motions of the first and the second rod element.

The particularly only one hinge assembly is configured to swivel or pivot the first and the second toy member around the swivel axis, and thus to swivel or pivot the first and/or the second rod element around the swivel axis. By adopting different swivel angles the hinge assembly causes the first and the second toy member to adopt different angles to each other. As the first and the second rod member are comprised by the first and the second toy member, the distance between the two rod elements is adjustable by adjusting the swivel angle of the hinge assembly.

When the swivel angle of the hinge assembly is adjusted, the first and the second rotation axis particularly perform a circular motion that is directed towards or away from each other around the swivel axis.

The swivel axis particularly extends essentially parallel or along an average direction (in case of non-parallel rotation axes) of the first and the second rotation axis.

It is noted that the swivel axis is particularly a virtual geometrical axis and particularly not necessary a solid axis throughout the massage toy A hinge assembly in the context of the current specification particularly does not allow and is not configured to perform multiple turns around the swivel axis, but only a swivel motion around the swivel axis, wherein said swivel motion does not exceed a swivel angle greater than 360°.

The distance between the first and the second rod element is particularly defined or provided by the distance between the first and the second rotation axis. The distance between two straight lines (e.g. axes) has particularly a well-defined mathematical notion, namely the shortest distance between any two points on the axes.

In a cross-section that particularly extends orthogonally through the swivel axis of the hinge assembly, the first rotation axis and the swivel axis are essentially arranged on in a triangle, particularly in an isosceles triangle, where the rotation axes have the same distance to the swivel axis.

The swivel angle is particularly defined by said triangle, particularly wherein a first connecting line extending between the first rotation axis and the swivel axis and a second connecting line extending between the second rotation axis and the swivel axis enclose said adjustable swivel angle.

The swivel angle is particularly manually adjustable, particularly by moving the first and/or the second toy member.

According to another embodiment of the invention, the massage toy has a front side and back side facing away from the front side, wherein the first and the second rod element are arranged such that they are accessible to the sexual organ from the front and the back side of the massage toy, particularly such that is can be used from both sides.

According to another embodiment of the invention, a penetration opening is formed between the first and the second rod element, wherein the penetration opening extends within a plane defined by the first and the second rotation axis, wherein from said penetration opening a penetration portion extends along a penetration axis that extends particularly orthogonal from the penetration opening and thus from the plane towards the swivel axis, wherein the penetration portion extends through the swivel axis, wherein the penetration portion is devoid of any rigid components, such as the hinge assembly.

This embodiment allows for a particularly compact design of the massage toy.

The plane comprising the penetration opening particularly comprises the first and the second rotation axis in case the rotation axes extend parallel to each other. In case the rotation axes extend such that a plane comprising both axes cannot be defined (e.g. due to non-parallel rotation axes), an average orientation of the first and the second rotation axis can be used for defining the plane that extends along said average orientation and wherein two points of intersection of the first and the second rotation axis with said plane are particularly arranged in a middle of the rotation axes.

By adjusting the swivel angle and thus the distance between the first and the second rod element, the size of the penetration opening is adjustable, such that the first and the second rod element can be brought in touch with the sexual organ, particularly a penis arranged between the rod elements.

The penis is particularly arranged between the first and the second rod element and extends particularly through the penetration opening into the penetration portion of the massage toy.

According to this embodiment, the penis can extend in the penetration portion through the swivel axis without touching the hinge assembly, which allows for a compact design of the massage toy.

Depending on the outer surface contour of the first and the second rod element, the penetration opening can assume various shapes.

According to another embodiment of the invention, the hinge assembly comprises a first hinge member.

The hinge assembly or the first hinge member are particularly arranged on a top section of the first and the second toy member, and connects the toy members at the top section.

According to this embodiment the massage toy is particularly u-shaped.

According to another embodiment of the invention, the hinge assembly comprises a first and a second hinge member, wherein the first and the second hinge member are configured to adopt the adjustable swivel angle, and wherein the first hinge member is arranged at a top section of the first and the second toy member and wherein the second hinge member is arranged on a bottom section of the first and the second toy member, particularly such that the penetration portion is devoid of the first and/or the second hinge member.

This embodiment allows for a compact and robust design of the massage toy.

The first and the second hinge member particularly each comprise a hinge or each form a hinge.

The first and/or the second hinge member can be comprised and particularly integrally formed by corresponding hinge features of the first and the second toy member.

Embodiments comprising two hinge members particularly arranged on the top and bottom section of the toy members, are particularly more robust.

The top and the bottom section of the first and the second toy member are particularly located at a first end section of the first and second rod element and a second end section opposite the first end section of the first and the second rod element. Said end sections are particularly located on the bottom and top face of the first and the second rod element.

According to this embodiment the massage toy is particularly o-shaped or square-shaped.

According to another embodiment of the invention, the hinge assembly comprises or is formed as an articulated bridge, particularly wherein the first and the second hinge member are each formed as an articulated bridge.

Articulated bridges are for example used in binoculars for adjusting the distance between the two ocular tubes to a users eye distance.

According to this embodiment, the articulated bridges provides a convenient means to adjust the distance between the first and the second rod element, in order to fit the distance between the rod elements and particularly the penetration opening to the sexual organ, e.g. the penis.

According to another embodiment of the invention, the swivel angle of the hinge assembly is adjustable and particularly limited to a range between 30° and 330°, particularly between 45° and 315° , more particularly between 90° and 270°.

The range of adoptable swivel angles is particularly limited by geometric constraints of the massage toy for example by the shape of the first and the second toy member.

This embodiment allows for swivelling the first and the second toy member such that the distance between the first and the second rod member increases (for swivel angles between 30 ° and 180°) and then decreases again (for swivel angles larger than 180°). Therefore, this embodiment allows for a symmetric design of the massage toy and/or for incorporation of different swivel characteristics for specific swivel angle ranges as will be disclosed in the following embodiment.

According to another embodiment of the invention, the hinge assembly is configured to adopt continuously variable swivel angles for swivel angles smaller than 180° and to adopt stepwise engaging swivel angles for swivel angles greater than 180°, such that the hinge assembly can be moved incrementally stepwise between a predefined number of discrete swivel angles for swivel angles greater than 180°.

The engaging mechanism or snap-in mechanism can be for example provided by a number of snap-in positions for the hinge assembly.

This embodiment allows for various uses of the massage toy. Either by locking the swivel angle using the engaging mechanism of the hinge assembly such that the corresponding distance between the rod elements is maintained and does not change during use, or by leaving the swivel angle adjustable, so that pressure on the sexual organ can be varied continuously particularly manually.

According to another embodiment of the invention, the massage toy comprises a locking element or a torque adjustment element for locking the hinge assembly or for adjusting a resistance of the hinge assembly with respect to an counter-torque attacking the swivel assembly due to the pressure provided by the massage toy on the sexual organ, such that the swivel angle and thus the distance between the first and the second rotation axis is maintained and particularly remains constant during operation and use.

According to another embodiment of the invention, the motor assembly comprises a first motor for rotating the first rod element around the first rotation axis and a second motor for rotating the second rod element around the second rotation axis, particularly such that the first and the second rod can be rotated by the motor assembly independently from each other.

This embodiment allows for more modes of operation of the massage toy.

According to another embodiment of the invention, the motor assembly comprises at least one electric motor, particularly wherein the first and the second motor each are an electric motor, particularly wherein the at least one electric motor is a stepper motor, particularly wherein the stepper motor has a step resolution of more than 50, particularly more than 100, more particularly more than 150 steps per full rotation, i.e. per 360° of the respective rod.

The higher the resolution of the stepper motor the more patterns of rotation can be executed by the massage toy and the more detailed and stimulating the feel of the massage toy becomes, particularly as due to the high nerve density in sexual organs, the organ is sensitive to comparably small tactile motions of the toy.

According to another embodiment of the invention, the massage toy is configured to provide a step resolution of more than 200, particularly more than 400, more particularly more than 700 steps per full rotation, particularly due to a software based control-system for the stepper motor.

One advantage of stepper motors is that the massage toy can be battery driven, silent operation is achieved and stepper motors can be driven digitally with high precision.

According to another embodiment of the invention, the massage toy comprises a position sensor for the first and/or the second rod, wherein the position sensor is configured to determine a position, particularly an angular position of the first and/or the second rod, such that an information is generated about a positon of the first and/or the second rod that can be processed further by a processor unit comprised by the massage toy.

According to this embodiment, the first and/or the second rod can have an associated position sensor. According to another embodiment of the invention, the massage toy is a battery-driven massage toy, particularly wherein the massage toy comprises a battery for providing electricity to the at least one electric motor of the motor assembly of the massage toy.

According to this embodiment, the massage toy does not require to be connected to mains current for operation, allowing an unconstrained use.

The battery can be rechargeable.

The battery can be fixedly incorporated to the massage toy, particularly wherein the massage toy comprises a socket for connecting the massage toy to a charging device and/or particularly wherein the massage toy comprises a device for wireless charging, such as inductive or near-field charging.

According to another embodiment of the invention, the battery is comprised in a batter compartment of the massage toy that is configured to be repeatedly opened and closed, particularly manually, i.e. without a technical tool such as a screwdriver, such that an opening of the compartment is opened or closed particularly with a lid element, wherein, when the compartment is open, a user of the massage toy can remove or insert the battery from the compartment.

This embodiment allows for facile exchange of the battery.

According to another embodiment of the invention, the massage toy is watertight.

According to another embodiment of the invention, the massage toy is splash-proof, particularly according to the IPX4 of the IEC standard 60529.

According to another embodiment of the invention, the motor assembly is configured to rotate the first and the second rod element in a contra-rotating manner.

This can be achieved by a single or by two electric motors.

According to another embodiment of the invention, the first and the second rod element are mounted such on the first and the second rotation axis that if a torque is applied to the first and/or the second rod element that is larger than a predefined or adjustable maximum torque, said first and/or second rod element (i.e. the rod element experiencing said maximum torque) disengages from the motor assembly such that said first and/or second rod element are not rotatable by the motor assembly, particularly until the applied torque on said first or second rod falls below the predefined maximum torque.

For this purpose the massage toy can comprise a particularly adjustable slipping clutch.

Alternatively, traction provided by the motor assembly to the first and the second rod element can be transmitted via a friction-based connection that disengages when the maximum torque is exceeded.

This embodiment allows for a save operation of the massage toy.

According to another embodiment of the invention, the first and the second rod element each have an outer surface, particularly a lateral outer surface surrounding the respective rotation axis, wherein the outer surface of the first and/or the second rod element has at least partially, e.g. area by area a concave contour, particularly wherein a diameter of the first and/or the second rod element is smallest at a middle section of the respective rod element, particularly wherein the middle section is arranged at the middle of the respective rotation axis.

This shape of the rod element allows for a compact design that particularly is formed such that the penetration opening abuts a larger part of the penis providing an increased level of sensation.

According to this embodiment the penetration opening between the rod elements is particularly largest at a center of the massage toy.

The middle section is particularly located between the top and the bottom section of the first and the second toy member.

Alternatively, the first and the second rod element have a cylindrical outer contour, which allows for simple manufacturing and increased freedom of use.

According to yet another alternative embodiment, the outer surface of the first and/or the second rod element a has at least partially a convex contour, particularly wherein a diameter of the first and/or the second rod element is largest at the middle section of the respective rod element, particularly wherein the middle section is arranged at the middle of the respective rotation axis.

According to another embodiment of the invention, the outer a surface of the first and/or the second rod element has a first section that has a convex contour and a second section that has a concave contour.

According to another embodiment of the invention, the outer surface of the first and/or the second rod element is structured with protrusions and/or recesses.

This embodiment allows for increased sensation during operation.

According to another embodiment of the invention, the outer surface comprises a first and a second portion that are arranged adjacent to each other and adjoin each other essentially along an axial direction of the rod such that two sections are formed on the rod, wherein the first portion has a different surface .

This embodiment allows for example to provide a first and a second rod different surface contours, wherein the structure of the first portion of the surface is different than the structure of the second portion.

Particularly in combination with the position sensor, this embodiment allows for controlled use of the first and/or the second portion of the surface such that different kind of stimuli can be applied without exchanging the surface of the first and/or the second rod.

For example the first portion can have a smooth surface, wherein the second portion can have a burled surface.

According to another embodiment of the invention, the first and/or second rod element is not rotationally symmetric and/or is mounted off-center (with respect to its corresponding rotation axis) in the massage toy.

According to another embodiment of the invention, the first and the second rod element each comprise a cushion member enclosing a rigid shaft of the rod element, wherein the cushion member is configured to provide an elastic and particularly a soft touch to a sexual organ in contact with the first and/or second rod element.

According to another embodiment of the invention, the outer surface of the first and the second rod element consists of a skin-friendly, and particularly a smooth material, such as silicone, particularly medical grade silicone.

According to another embodiment of the invention, the first and/or the second rod each comprise an elastic sleeve and a rigid core, wherein the sleeve consists of an elastic material such as silicon, wherein the sleeve surrounds the core at least laterally and forms the outer surface particularly the outer lateral surface of the first and/or the second rod, particularly wherein the sleeve is positively locked and/or non-positively locked with the core, particularly with regard to a torque force applied to the sleeve and/or core.

This allows for the rods to require less silicon (as compared to rod element consisting of silicon only), which turn allows for more cost-sensitive manufacturing and a more lightweight massage toy.

According to another embodiment of the invention, the sleeve is configured to be elastically pulled over and pulled off the core, particularly wherein the sleeve is positively locked and/or non-positively locked with the core, when the sleeve is pulled over the core.

According to another embodiment, the core comprises a first a and a second core element, wherein the first and the second core element can be connected and disconnected to each other along an axial direction of the core.

According to another embodiment of the invention, the first and the second core are spring-loaded along the axial direction, particularly the rotation axis, of the rod element.

According to another embodiment of the invention, the first and the second core element can be connected and disconnected manually and repeatedly.

According to another embodiment of the invention, the first and the second core element are configured and formed to be telescopically pushed together such as to release to the rod element from an engagement with the massage toy and/or to fix the sleeve on the core, particularly wherein the sleeve is positively locked and/or non-positively locked with the core.

According to another embodiment of the invention, core and sleeve are formed such that the sleeve can by removed from the core particularly only, by pulling the first and the second part of the core from each other, such that core is disassembled, particularly wherein the positively locked and/or non-positively locked connection of the sleeve with the core is reduced or suspended, when the core is disassembled.

According to another embodiment of the invention, the outer surface of the first and/or the second rod element comprise feather-like structures, such as bird-feathers.

According to another embodiment of the invention, the massage toy comprises a heater for heating the first and the second rod element.

According to another embodiment of the invention, the outer surface of the first and/or the second rod element is structured, particularly wherein the outer surface comprises burls, ripples and/or lamellae.

The structured surface is particularly comprised by the sleeve.

According to another embodiment of the invention, the first and the second toy member each comprise a catch-and-release mechanism provided by suitable components of the massage toy that is configured to release the first and the second rod element from the first and second toy member and to catch the first and the second rod element in the first and the second toy member, wherein the catch-and-release mechanism is configured to be operated manually and particularly without a tool.

The catch-and-release mechanism can for example be based on magnetic components or by a turn-to-lock mechanism.

This embodiment allows facile changing of the rod elements, e.g. for cleaning or for exchange purpose, such that another pair of rod elements or solely one other rod element can be used with the massage toy.

According to another embodiment of the invention, the massage toy, particularly a least one of the first or the second rod elements or both rod elements comprise a lubricant reservoir, wherein the lubricant reservoir is connected to the outer surface of the first and/or the second rod element such that the outer surface of the first and/or the second rod element can be provided with lubricant during operation of the massage toy.

According to another embodiment of the invention, the massage toy comprises an electronic circuit comprising a processor unit with a memory, wherein the processor unit is configured to control the motor assembly for the rotation of the first and the second rod element, particularly wherein the motor assembly is controlled by the processor unit according to a computer program stored on the memory that, when executed, provides the processor unit with instructions causing the processor unit to control the motor assembly to execute predefined rotation patterns coded in the computer program.

This embodiment allows complex rotation patterns to be executed by the massage toy.

The term "rotation pattern" according to the specification particularly refers to any particularly repeating sequence of rotations of the first and the second rod element, wherein a sequence of rotations particularly comprises one or more rotation speeds and one or more rotation ranges of the first and the second rod element.

According to an embodiment of the invention, the massage toy comprises a receiving module for external signals, such as a radio frequency module, a Bluetooth module, a WiFi module, an infrared receiver and/or an ultra-sound receiver.

According to another embodiment of the invention, the massage toy is configured to receive instructions from an external device such as a mobile device particularly via the Bluetooth module, wherein said instructions cause the processor unit to control the motor assembly to execute a rotation pattern according to the instructions from the external device.

In this context the external device can comprise a sensor for providing sensor signals in form of external input signals to the massage toy. Alternatively or additionally, the external device is configured to provide external input signals reflecting acoustic signals generated from a sound source or a sound file.

According to another embodiment of the invention, the massage toy is configured to form a local area network, particularly a wireless computer network (WLAN), wherein the massage toy forms an access point of the local area network and wherein a station, such as a computerized device, a mobile device or a computer, can connect to the massage toy and forms a client.

According to another embodiment of the invention, the massage toy is configured to provide the client connected to the massage toy with a control interface for controlling and/or adjusting operation parameters and or components of the massage toy.

This embodiment allows for the generation of a separate and privacy maintaining network such that privacy data are not exchanged via the internet or routed via a plurality of websites.

According to another embodiment of the invention, the massage toy, particularly the processor unit is configured to provide a processed control signal to the stepper motor, wherein the control signal allows for particular silent motor operation.

According to another embodiment of the invention, the external device is a computerized device or comprises a computer, wherein the computerized device or the computer comprises a computer program with computer program code to generate and adapt the rotation pattern configured to be executed by the massage toy.

According to another embodiment of the invention, the massage toy comprises a manual selection component, such as a turn knob, configured to select from a plurality of operation programs for the massage toy.

The operation programs are particularly stored on the massage toy, such that no external device is needed to use the massage toy, therefore being safer against unauthorized data hacking and data hijacking.

The operation programs can be custom-designed, such that the massage toy allows for individual operation programs.

Once an operation program has been designed it can be uploaded to toy and stored in a memory storage of the massage toy.

According to this embodiment a user of the massage toy can select from a plurality of operation programs that for example provide different rotation speeds and/or direction for the rod elements as well as different rotation patterns.

The operation programs are particularly computer programs stored on the massage toy or an external device, such as a mobile device.

According to another embodiment of the invention, the massage toy comprises at least one light indicator, such as an LED, or a plurality of light indicators, such as an LED assembly, wherein the at least one light indicator is configured to indicate a selected operation program by lighting up.

The indication is for example facilitated by interleaved illumination of the at least one light indicator or by turning on a selected light illuminator of the plurality of light indicators.

According to another embodiment of the invention, the massage toy comprises a manual turning range control component, such as a turn knob or ring that is configured to limit a turning range of the first and the second rod element, i.e. how much of a fraction of turns particularly in a contra-rotating manner, each rod element rotates when operated.

During operation the rod elements are rotated back and forth within the specified turning range.

According to another embodiment, the massage toy comprises a manual speed control component, such as a turn knob or ring that is configured to select a rotation speed of the first and the second rod element during operation.

According to this and the previous embodiment a user can adjust the mode of operation by manually adjusting the speed and the turning range of the first and the second rod element during operation with the respective manual control component.

The term "manual" in the context of control components particularly refers to the property of the component of being manually operatable.

According to another aspect of the invention, the problem is solved by a system comprising the massage toy according the invention and a third as well as a fourth rod element, wherein the first and the second rod element are exchangeable by the third and the fourth rod element, wherein the third and the fourth rod element differ in at least one of the following properties from the first and second rod element:

- A surface material composition, such as textile, or silicone;
- An outer surface contour, such as concave, convex, or straight;
- An elasticity of the rod providing a varying softness;

This aspect allows for a system having a plurality of rod elements that provide a different feel to the sexual organ.

It is noted that terms and definitions for the massage toy equally apply to the system, particularly embodiments relating to aspects of the first and/or second rod can be applied to the third and the fourth rod and vice versa. According to another embodiment of the invention, the system comprises a sensor for providing an external input signal in form of a sensor signal to the massage toy, the sensor signal particularly comprising a bio-feedback function, such as a heartbeat frequency or brain waves, such that operation of the massage toy is adaptable based on the sensor signal.

The invention further relates to a system comprising a massage toy according to the invention and an external computerized device such as a mobile device, wherein the external device and the massage toy are wireless connectable such as to communicate with each other.

According to another embodiment of the invention, the massage toy is configured to be controlled by the external device at least with respect to the rotation patterns executed by the massage toy.

According to another aspect of the invention, an external computerized device such as a mobile device like a smart phone or tablet comprising a computer program for controlling and/or for providing the massage toy with instructions configured to adjust or control a rotation pattern executed by the massage toy, when the computer program is executed, is disclosed.

According to another aspect of the invention, a computer program for controlling a rotation pattern of the massage toy is disclosed, wherein the computer program is adapted to generate instructions causing the massage toy to perform the rotation pattern, when the computer program is executed on a computer or a computerized device.

The invention further relates to a method for operating a massage toy according to the invention, the method comprising the steps of

- Particularly switching the massage toy from a sleep or a power-off mode to an operation mode;
- Selecting at least one of:
  - a) a rotation speed of the first and the second rod element, particularly directly at the massage toy or with a remote control;
  - b) a turning range of the first and the second rod element, particularly directly at the massage toy or with a remote control;
  - c) a rotation pattern particularly stored in an operation program for the massage toy, particularly directly at the massage toy or with a remote control;
- Adjusting the distance between the first and the second rod element by adjusting the swivel angle of the hinge assembly;

The method is particularly incorporated in form of a computer program.

According to another embodiment of the invention, the method further comprises the step of:

- Defining a rotation pattern of the first and the second rod element by means of a user input;
- Storing the rotation pattern on a memory of the massage toy or an external device;

According to another embodiment of the invention, the method comprises the step of providing an external input signal to the massage toy such as an electric signal coding for an acoustic signal, wherein the electric input signal is converted in a rotation pattern in real time.

The acoustic signal can for example be obtained by the sensor, e.g. comprising a microphone, wherein the sensor provides the sensor signal as the external input signal to the massage toy.

The acoustic signal can comprise ultra-sound frequencies and frequencies that can be heard by the human ear.

The external input signal can also comprise signals from any kind of electronically stored medium such as a video, a sound or a music file.

The term "real-time" particularly refers to a processing speed of the massage toy that is so high that the amount of incoming information via the electric input signal to the massage toy and the amount of processed incoming information is on average identical, such that a memory overflow is omitted.

The term "real-time" further particularly refers to a time lag between incoming input signal and conversion of the incoming input signal is below 1s.

The terms 'processor unit' or 'computer', or system thereof, are used herein as ordinary context of the art, such as a general-purpose processor or a micro-processor, RISC processor, or DSP, possibly comprising additional elements such as memory or communication ports. Optionally or additionally, the terms 'processor unit' or 'computer' or derivatives thereof such as 'computerized device' denote an apparatus that is capable of carrying out a provided or an incorporated program and/or is capable of controlling and/or accessing data storage apparatus and/or other apparatus such as input and output ports. The terms 'processor unit ' or 'computer' denote also a plurality of processors or computers connected, and/or linked and/or otherwise communicating, possibly sharing one or more other resources such as a memory.

A mobile device is a small computer, particularly small enough to hold, wear and operate in the hand and having an operating system capable of running mobile apps computer program designed to run on mobile devices. A mobile device is therefore a computerized device that is portable and weights particularly less than 500 g.

A mobile device, such as a mobile phone, a smart phone, a smart watch, a portable music player or a tablet computer, particularly comprises at least one processor, the so-called CPU (central processing unit). Furthermore, a mobile device particularly comprises means for cellular network connectivity for connecting to a mobile network, such as for example GSM (Global System for Mobile Communications), 3G, 4G or 5G, CDMA (Code Division Multiple Access), CDMA2000, UTMS (Universal Mobile Telecommunications System), or LTE (Long Term Evolution).

The mobile device particularly comprises a display screen with a small numeric or alphanumeric keyboard or a touchscreen configured to provide a virtual keyboard and buttons (icons) on-screen. The mobile device is particularly configured to connect to the Internet and interconnect with other computerized devices via Wi-Fi, Bluetooth or near field communication (NFC). Integrated cameras, digital media players, mobile phone and GPS capabilities are common.

According to an alternative embodiment of the invention, a massage toy for stimulation of and/or arousing a sexual organ such as a penis or a vulva, comprises at least the following components:

A first toy member of the massage toy, wherein the first toy member comprises a first rod element extending along a first rotation axis, wherein the first rod element is arranged, particularly mounted rotatably on the first rotation axis, particularly wherein the first rod element is configured to be in touch or to be brought in touch with the sexual organ for stimulation;

A second toy member of the massage toy, wherein the second toy member comprises a second rod element extending along a second rotation axis, wherein the second rod element is arranged rotatably on the second rotation axis, particularly wherein the second rod element is configured to be in touch or to be brought in touch with the sexual organ for stimulation;

An adjustment assembly that connects the first toy member with the second toy member such that a distance between the first rotation axis and the second rotation axis is adjustable by the adjustment assembly;

A motor assembly for motor-driven rotation of the first rod element around the first rotation axis and for motor-driven rotation of the second rod element around the second rotation axis.

The adjustment assembly can for example be configured to particularly laterally shift the first and the second toy member along a guide member for adjusting the distance between the toy members.

Embodiment relating to the toy members and/or the rod elements as well as to other components of the massage toy are applicable to this alternative embodiment as well.

The adjustment assembly can be the hinge assembly.

FIGURE DESCRIPTION

Particularly, exemplary embodiments are described below in conjunction with the Figures. The Figures are appended to the claims and are accompanied by text explaining individual features of the shown embodiments and aspects of the present invention. Each individual feature shown in the Figures and/or mentioned in said text of the Figures may be incorporated (also in an isolated fashion) into a claim relating to the device according to the present invention.

It is shown in

Figure 2:
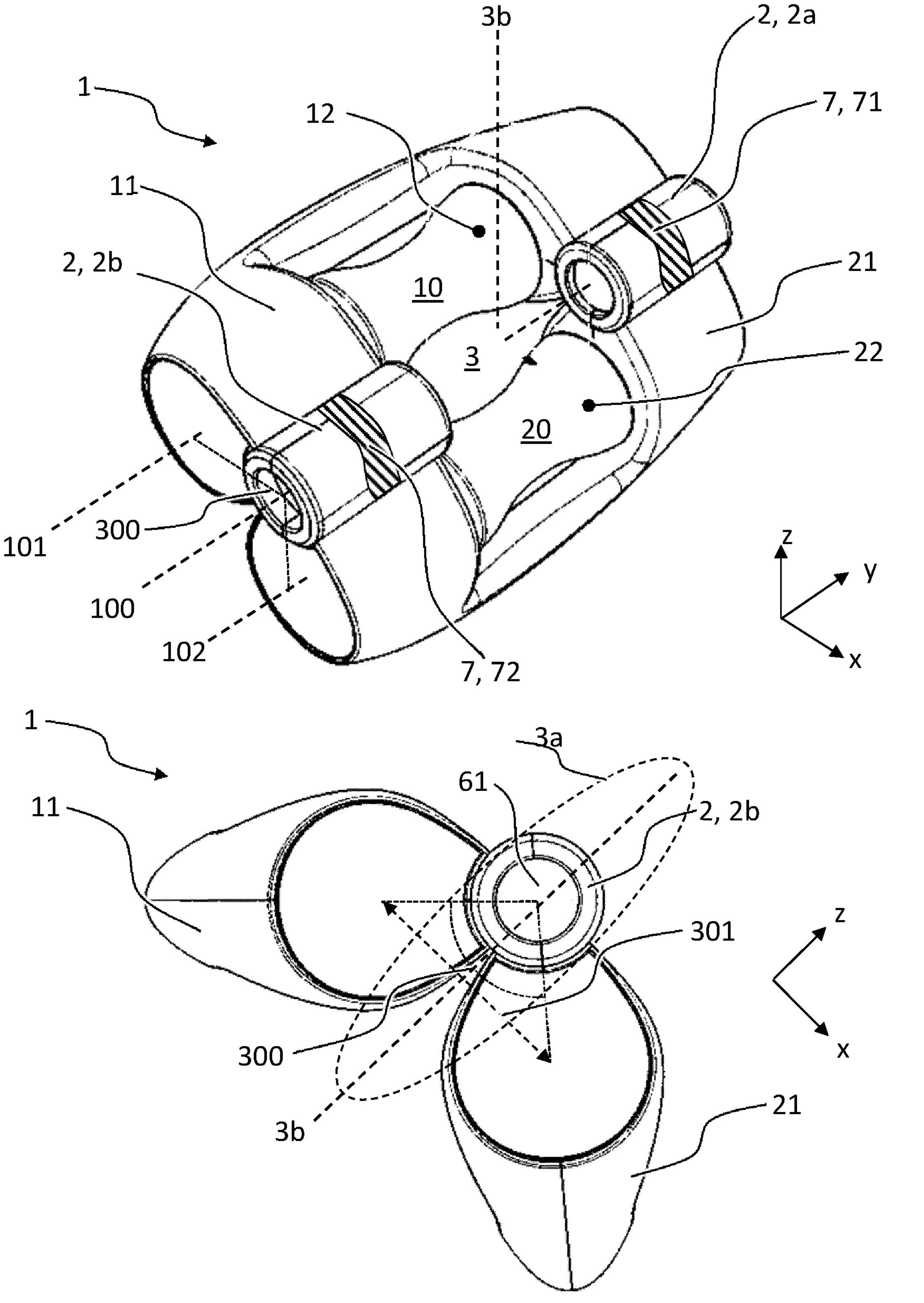
Figure 3:
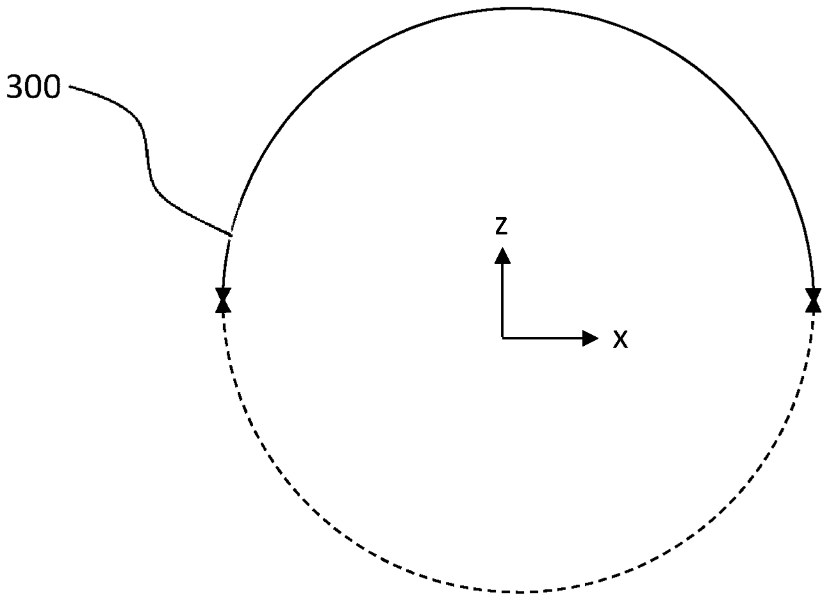
Figure 4:
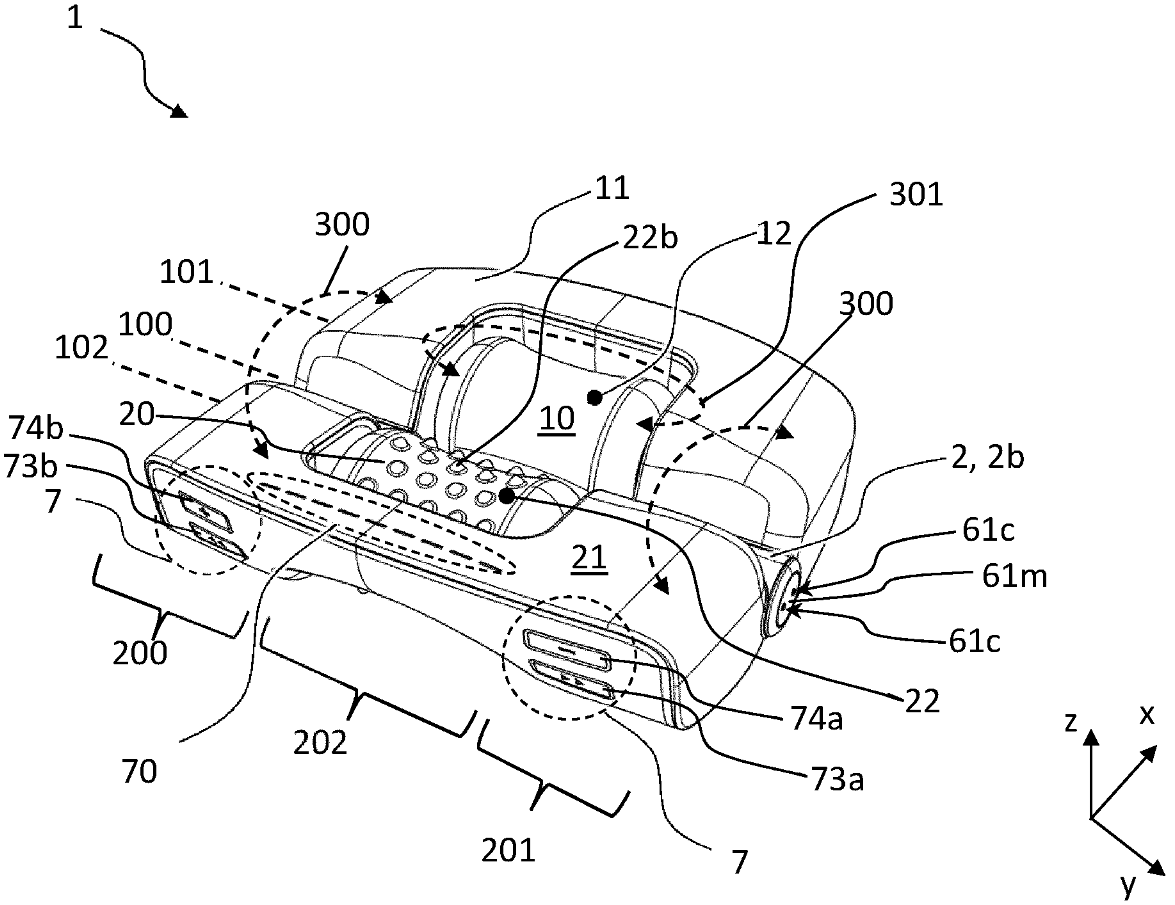
Figure 5:
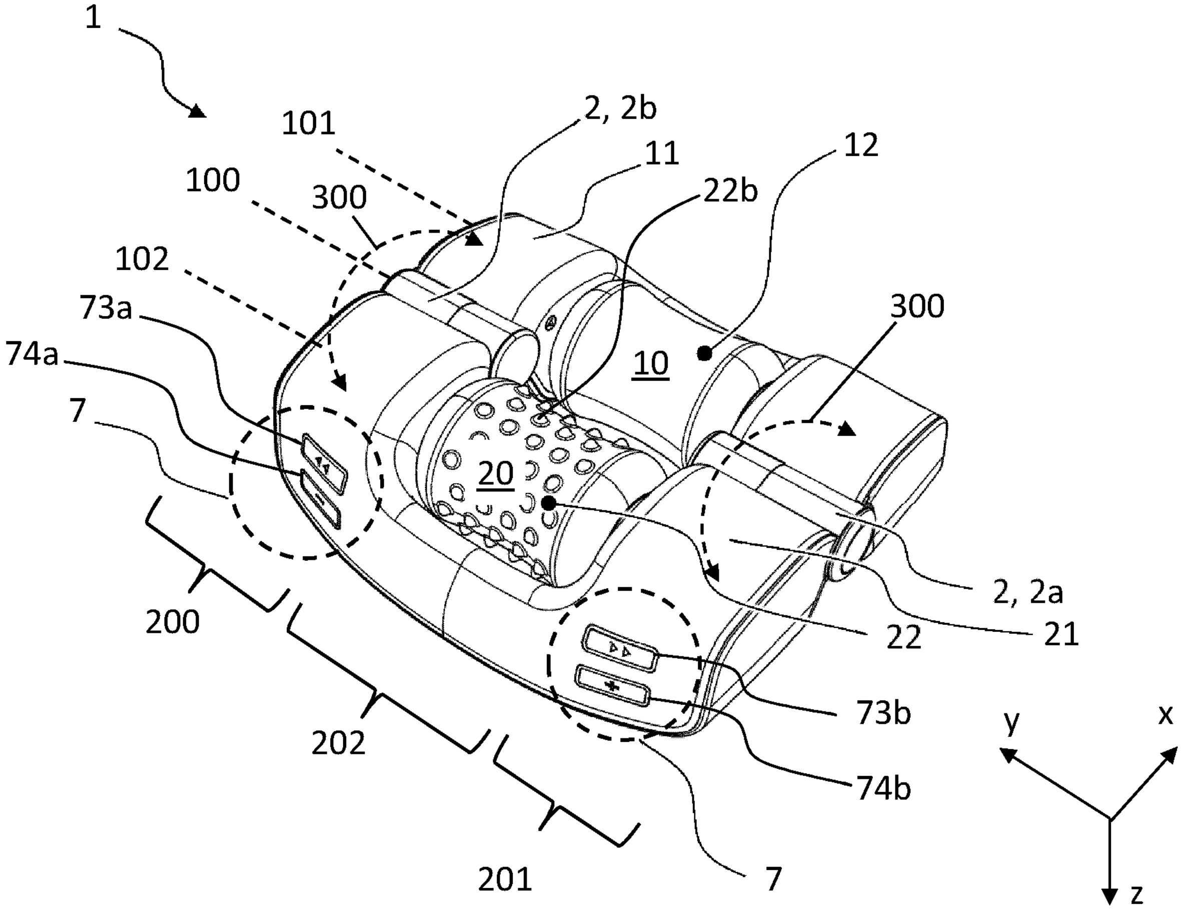
Figure 6:
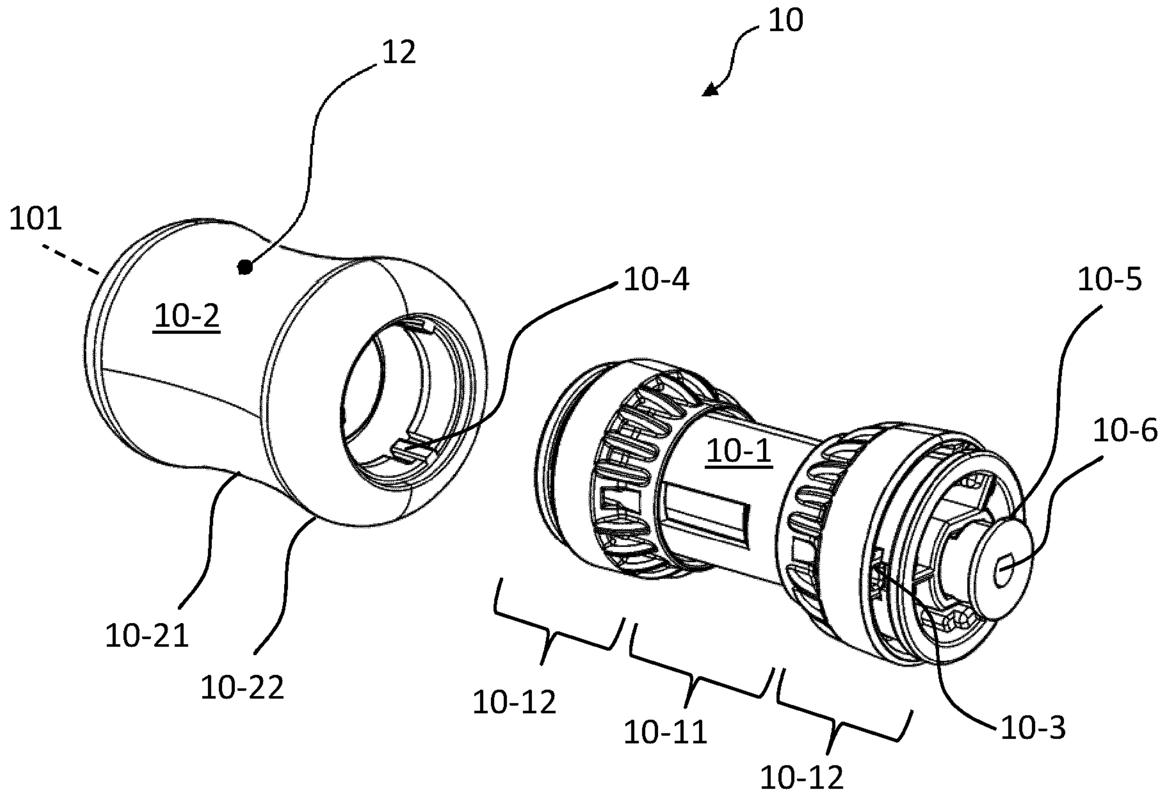
Figure 7:
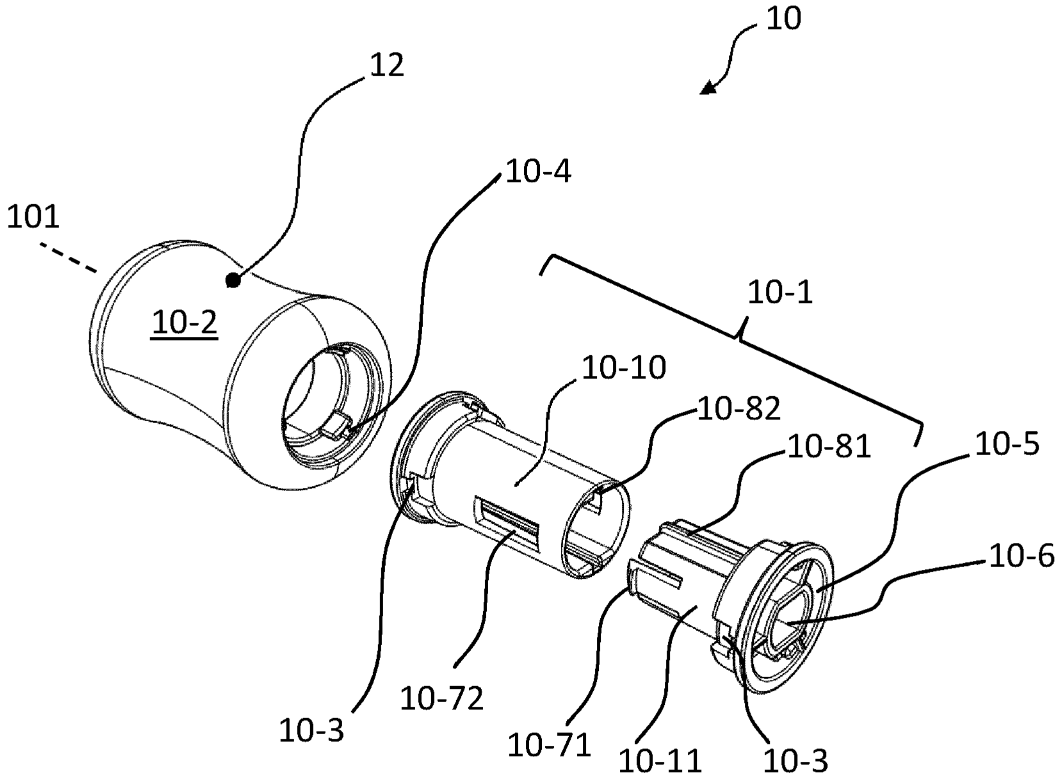

FIG. 1 different views of one embodiment of the massage toy in an extended state adopting a swivel angle of 180° are shown;

FIG. 2 different views of one embodiment of the massage toy adopting a swivel angle smaller than 180°;

FIG. 3 a schematic drawing for the snap-in and continuous adjustment mode for different swivel angles of the massage toy;

FIG. 4 a three-dimensional front-side view of a second embodiment of the massage toy according to the invention;

FIG. 5 a three-dimensional back-side view of the second embodiment of the massage toy according to the invention;

FIG. 6 a first embodiment of the rod element according to the invention; and FIG. 7 a second embodiment of the rod element according to the invention.

The following figure description refers to FIG. 1 and FIG. 2 as long as not otherwise noted. In FIG. 1, FIG. 2, FIG. 4 and FIG. 5 various particularly semi-open views of the massage toy in an extended configuration are shown.

The massage toy 1 comprises two rod elements 10, 20, namely the first rod element 10 and the second rod element 20, that are arranged laterally shifted along an x-axis of the massage toy 1. The rod elements 10, 20 each extend along its own rotation axis 101, 102 around which the rod elements 10, 20 can rotate. The massage toy 1 further comprises a first and a second toy member 11, 21 that are rotatably connected to each other by means of a hinge assembly 2. The hinge assembly 2 consists of two hinge members 2*a*, 2*b*, wherein the hinge members 2*a*, 2*b* are arranged at a top section 200 of the massage toy 1 and a bottom section 201 of the massage toy 1 along the same swivel axis 100. The swivel axis 100 extends along a y-axis of the massage toy. The hinge assembly 2 with its two hinge members 2*a*, 2*b* is the only connection between the first and the second toy member 11, 21.

The two hinge members 2*a*, 2*b* are both formed as an articulated bridge.

Between the two hinge members 2*a*, 2*b* of the hinge assembly 2 a penetration opening 3 is formed by the hinge assembly 2 and the first and the second rod element 10, 20. The penetration opening 3 extends in a plane along the x-y axes.

The first and the second toy member 11, 21 form a foldable frame of the massage toy 1, wherein the frame essentially extends in the x-y plane when the toy is in its extended state, i.e. at 180° swivel angle 300. The first and the second toy member 11, 21, encompass either the first or the second rod element 10, 20 respectively in a bracket like manner. The sections 202 of the toy members 11, 21 extending laterally around the rod elements 10, 20 can be formed as handles for holding the massage toy 1. The first and the second toy member 11, 21 are formed from a rigid material, such as a polymer or a metal that provides a frame for the first and the second rod 10, 20. The first and/or the second toy member 11, 21 house various electronic and electric components of the massage toy, such as the motor assembly 5 for driving the rod elements 10, 20, a control circuit 40, as well as an energy storage 6, like a battery.

The first and the second rod element 10, 20 are rotatably mounted in the first and second toy member 11, 21 respectively and have an outer surface 12, 22 surrounding the rotation axis 101, 102 of the respective rod element 10, 20. The outer surface 12, 22 of each rod element 10, 20 is configured to be brought in touch with the sexual organ. For this purpose, at least the outer surface 12, 22 of the rod elements 10, 20 comprises or consists of a skin-friendly material or compound, such as silicone. Additionally, the first and the second rod element 10, 20 are elastically deformable such that upon a pressure applied on the surface 12, 22 of the rod element 10, 20 said rod element 10, 20 is repeatedly deformable, such that a pleasing impression is evoked on the sexual organ. The degree of softness can be varied by using different kinds of rod elements 10, 20. Also, rod elements 10, 20 having an outer surface 12, 22 with different surface characteristics for example due to a different surface material or due to a different structure of the surface 12, 22, can be provided. It is noted that the surface 12, 22 of the rod elements 10, 20 does not have to be even but can comprise recesses and protrusions. Moreover, it is possible to provide rod elements 10, 20 having different outer contours of the surface 12, 22 and/or different radii.

In order to exchange a rod element 10, 20 of the massage toy 1 with another rod element, the massage toy 1 comprises a catch and release component for each rod element 10, 20. The catch-and-release component is manually operatable, i.e. without additional tools, allowing a) a facile release of the rod element 10, 20 for cleaning purposes;
b) a simple exchange mechanism for using a different rod element.

Each toy member 11, 21 comprises a stepper motor 5*a* of a motor assembly 5, wherein each motor 5*a* is configured to drive and rotate the corresponding rod element 10, 20. For this reason each motor 5*a* is connected with a motor axis to the rotation axis 101, 102 of the first and second rod element 10, 20. In this embodiment the motor 5*a* is located inside the massage toy members 11 at the top or the bottom section 200, 201 of the massage toy 1 (the motor for the second rod element is not visible). On the respective other section 201, 200 of the massage toy 1 the rod elements 10, 20 are rotatably mounted, particularly with the catch-and-release component, with the corresponding toy member 11, 21.

The motor assembly 5 is configured to rotate the first and the second rod element 10, 20 particularly stepwise around the rotation axis 101, 102. In comparison to other electrically driven motors that are configured to produce for example vibrations of a massage toy, stepper motors for rotation provide a silent operation alternative. Therefore, the massage toy 1 is comparably silent during operation.

In the lateral sections 202 of the massage toy 1 the rechargeable battery 6 is arranged for providing the motor assembly 5 and the control circuit 40 with electricity.

For charging the battery 6 the massage toy 1 comprises a particularly magnetic charging socket 61 configured to receive a corresponding charging plug from a charging device.

The toy members 11, 21 also house a control electronic circuit 40 comprising a processor unit 41 for controlling the motor assembly 5 as well as a charging controller 43. The control electronics circuit 40 comprises a Bluetooth module 44 for wireless connection with external devices for example for receiving computer programs or sensor signals. The massage toy 1 comprises a memory 42 for storing control parameters such as rotation speed and rotation range of the first and the second rod element 10, 20.

The control parameters can be stored in the computer program. Moreover, the computer program (also referred to as operation program) can additionally comprise rotation patterns that define a sequence of rotations and rotation speeds for the first and the second rod element 10, 20.

The massage toy 1 is configured to receive new rotation sequences or patterns that can be stored in the memory 42 and loaded for execution by the processor unit 41 and the motor assembly 5.

To select or adjusting a rotation speed and/or a rotation range of the first and the second rod element 10, 20 the massage toy 1 comprises a selection assembly 7 such as two rotary knobs or ring elements 71, 72 incorporated in the hinge assembly 2 for changing the rotation speed and/or the rotation range, as shown for example in FIGS. 1 and 2. Additionally or alternatively, the selection assembly 7 is configured to select an operating program stored in the memory 42 for execution.

The massage toy 1 is configured such that it can be updated with new rotation patterns. Such a rotation pattern can for example be user defined programs comprising information in the rotation speed and the rotation range for the first and the second rod element 10, 20. Thus, complex rotation sequences can be provided to the massage toy.

Moreover, the massage toy 1 therefore provides the possibility to manually adjust rotation patterns with the selection assembly 7 and/or to use preprogrammed rotation patterns.

Additionally, it is possibly to store user-created rotation patterns on the massage toy 1, such that they can be used at a later time.

For the purpose of controlling the massage toy the massage toy can be connected to a mobile device, such as a mobile phone or smart watch, running a software for controlling the massage toy 1. The software on the mobile device can be connected via the Bluetooth module 44 and provide instructions to the processor unit 41 for controlling the rotation patterns of the motor assembly 5. The mobile device can particularly comprise the external sensor and/or provide the external sensor signals to the massage toy 1.

The massage toy 1 furthermore comprises a component for receiving external control signals, such as for example signals coding for music or other sounds. These signals can be provided by a sensor or the external device to the massage toy 1.

Additionally or alternatively, the sensor can also comprise a component for receiving or estimating a heartbeat, a breathing or a movement of a user and wherein the sensor is configured provide corresponding electric control signal to the massage toy 1.

The massage toy 1 comprises an emergency stop interface 8 such as a knob for immediate interruption of toy operation (cf. e.g. FIG. 1 and FIG. 2).

The massage toy 1 can be used for example for sexual stimulation of a penis or a vulva by providing tactile sensations with its rotating rod elements 10, 20 to the sexual organ.

For stimulation of a penis with the massage toy 1 the penis can be arranged between the two rod elements 10, 20 in the penetration opening 3 such that the penis extends in the penetration portion 3*a* of the massage toy 1. A user can adjust the swivel angle 300 of the hinge assembly 2 such as to provide the penis a pleasant pressure and touch of the rod elements 10, 20. Moreover, a user can rotate the massage toy 1 along the x-y plane and achieve stimulation of the penis from various sides.

For stimulating a vulva, for example the vulva can be brought in contact with the first and second rod element 10, 20, wherein the vulva is particularly positioned between the gap of the first and the second rod element 10, 20.

For additional diverse modes of use, the hinge assembly 2 can swivel around the swivel axis 100 such as to adjust the distance between the rotation axes 101, 102 of the rod elements 10, 20 and thus to adjust the distance between the rod elements 10, 20. The penetration opening 3 therefore can be adjusted in size by adjusting the swivel angle 300. The swivel angle 300 is defined by the angle enclosed by the first and the second rotation axis 101, 102 and the swivel axis 100. The hinge assembly 2 can adopt swivel angles 300 between approximately 30° and 330° constrained particularly due to geometric reasons imposed by the toy members 11, 21. As the massage toy 1 is largely symmetric with respect to the swivel axis 100 and the z-axis, the swivel angle 300 of 90 ° essentially corresponds to a swivel angle 300 of 270°.

However, for providing different modes of adjustment the hinge assembly 2 comprises a snap-in mechanism for swivel angles 300 between a minimum swivel angle, e.g. 30° and 180° (cf. e.g. FIG. 3, dotted line). The snap-in mechanism provides the hinge assembly 2 with a plurality of discrete swivel angles 300, for examples in steps of 1°. The hinge assembly 2 therefore can adopt only a limited number of positions when the swivel angle 300 is between the minimum angle and 180°. In each position the snap-in mechanism provides a stable torque resistant swivel angle 300 to the massage toy 1 such that a once adjusted, the swivel angle 300 remains stable also during operation and use.

For swivel angles of 180° and larger, the hinge assembly 2 can adopt swivel angles 300 in a continuous fashion, i.e. particularly without the snap-in mechanism (cf. e.g. FIG. 3 continuous line).

The massage toy 1 can comprise a locking component (not shown) for locking and unlocking the hinge assembly 2 in user defined swivel angle 300.

Once the swivel angle 300 is adjusted and a rotation pattern is chosen, the rod elements 10, 20 of the massage toy perform said rotation pattern particularly in a repeated manner and the sexual organ brought in touch with the massage toy is exposed to said motions.

In addition to FIGS. 1 and 2, in FIG. 4 and FIG. 5 an embodiment is shown, where the first and the second rod 10, 20 comprise different outer surfaces, 12, 22. The outer surface 12 of the first rod element 10 is smooth, wherein the outer surface 22 of the second rod element 20 comprises burls 22*b*.

FIG. 4 shows a front side of the massage toy 1, wherein FIG. 5 shows a backside of the massage toy 1.

In contrast to the embodiment shown in FIG. 1 and FIG. 2, the massage toy 1 in FIG. 4 and FIG. 5 the selection assembly 7 comprises a plurality of buttons 73*a*, 73*b*, 74*a*, 74*b*. The buttons 73*a*, 73*b*, 74*a*, 74*b* can be formed as micro-buttons, touch-sensor buttons, and/or mechanical buttons. In this embodiment the buttons are arranged on the second toy member 22. The selection assembly 7 comprises buttons 73*a* and 73*b* for increasing or reducing the rotation speed of the rod elements 10, 20.

Additionally the selection assembly comprises buttons 74*a*, 74*b* for changing an operation program of the massage toy 1.

The selected operation program is indicated by a LED assembly 70 that extends along the first toy member 21. The LED assembly 70 comprises a plurality of LEDs 70-1 that can be controlled independently from each other such that the massage toy is adapted to display a plurality of illumination patterns with the LED assembly 70. A selected mode of operation or a selected operation program is indicated by the LED assembly, for example by lighting up a specific illumination pattern of the LED assembly 70.

The massage toy 1 is configured to operate based on a user input, e.g. provided by the selection assembly 7.

The user may choose from a plurality of operation modes. For this purpose, the massage toy may comprise a plurality of preprogrammed operation programs. The programs may control a rotation speed of the massage toy, a range of turning of the first and the second rod and other parameters. Each time am operation program is selected, e.g. by the user, the corresponding mode of operation will be executed by the massage toy.

Moreover, the massage toy may comprise a plurality operation programs that comprise a plurality of operation modes that are executed in sequence, particularly one operation program executes a plurality of particularly user-selected operation modes in a random sequence at random duration.

The operation programs may be programmed or adjusted by a user, for example by means of an interface to the massage toy, such that a user-programmed operation program can be uploaded and executed to the massage toy. Said interface may be provided by means of a software application on a mobile device or a computer as elaborated previously.

The massage toy in FIGS. 4 and 5 comprises a magnetic charging the socket 61*m* for connecting the massage toy to a charging device. The magnetic socket allows for magnetic attachment of a charging plug, onto two charging contacts 61*c* of the charging socket 61*m*. The magnetic charging socket 61*m* is located at the hinge assembly 2. The magnetic charging socket 61 is electrically connected to the battery of the massage toy 1, such that the massage toy can be charged', when the socket is electrically contacted by a corresponding charging plug (not shown).

The embodiment shown in FIG. 4 and FIG. 5 has a swivel angle 300 range as indicated by the curved double arrows 300, that allow a user to bring the first and the second rod element 10, 20 closer together such as to adjust a pressure on the sexual organ, e.g. the penis.

The massage toy 1 in FIG. 4 can also be swivelled towards the backside as shown in FIG. 5 by the double arrows 300, wherein the swivel rang on the backside of the massage toy might be smaller than on the front side.

In FIG. 5 the catch and release mechanism for the first rod element 10 is exemplary depicted (which is the same for the second rod element 20) by reference sign 301. For releasing the first rod element 10 a user pushes a top portion and bottom portion of the first rod element 10 together towards the middle portion along the rotation axis 101 of the first rod element 10. The rod element 10 is spring-loaded such that a restoration force needs to be overcome in order to push the upper and lower end of the first rod element 10 towards each other. When the first rod element 10 is reduced sufficiently in extend, a connection portion 10-5 with a recess 10-6 located on the upper and the lower end of the first rod element (cf. e.g. FIGS. 6 and 7) disengages from the first rotation axis 101 and the first rod element can be removed from the massage toy 1. The rod element can then be further dissembled as shown in FIGS. 6 and 7. For inserting the first element 10 or another rod element a user pushed the rod element together along the axis of rotation 101 and releases it at the correct position in the massage such that the connection portion 10-5 with its recess 10-6 engages with the massage toy 1, In FIG. 6 a first exemplary embodiment of a disassembled rod element, in this case the first rod element 10 is shown. It is noted that the same embodiment can be applied to the second rod element 20. The rod element 10 comprises a rigid core 10-1 made from a rigid polymer and a sleeve 10-2. The sleeve 10-2 might be made of elastic silicon and might have a smooth outer surface 12. In the assembled state of the rod element 10, the sleeve 10-2 forms the outer surface 12 of the rod element 10. In FIG. 6 an illustration is shown, where the sleeve 10-2 is removed from the core 10-1. The core 10-1 has a middle portion 10-11 at which the diameter of the core 10-1 is smaller as compared to a top and bottom portion 10-12 of the core 10-1. Correspondingly, the sleeve 10-2 has a middle portion 10-21 that has at least on an inside of the sleeve facing towards the core 10-1 a smaller diameter then a top and bottom portion 10-22 of the sleeve 10-2. This allows for a non-positive locking fixation of the sleeve 10-2 on the core 10-1. Additionally, the core 10-1 and the sleeve 10-2 comprise corresponding recesses 10-3 and protrusions 10-4 such that a positive locking fixation between the sleeve 10-2 and the core 10-1 can be established. The rod element 10 according to FIG. 5 allows for an easy assembly and disassembly for cleaning purposes. Also, it is possible to use a plurality of different sleeves 10-2 on the same rod. The different sleeves 10-2 can have different outer surfaces. A rod element having a different sleeve or a different outer surface can be considered a different rod element.

The rod element 10 in FIG. 6 has a connecting portion 10-5 for being connected with the motor or a shaft of the motor assembly (not shown) of the massage toy. The connecting portion 10-5 comprises a recess 10-6 that has a cross-section orthogonal to the extension direction of the rotation axis 101 that allows for a positive locking with respect to a rotation around the rotation axis 101. For this purpose the cross-section of the recess 10-6 is particularly non-circular.

In FIG. 7 a further embodiment of the rod element 10 is shown. Similar to the rod element 10 of FIG. 5 the rod element 10 of FIG. 6 comprises an elastic sleeve 10-2 and a rigid non-elastic core 10-1.

The sleeve 10-2 has protrusions on a side facing towards the core 10-1 such that a positive locking fixation can be established between corresponding recesses 10-3 of the core 10-1 and the sleeve 10-2. The core 10-1 consists of a first core element 10-10 and a second core element 10-11 that can be telescoped. For this purpose, the first and (the second core elements 10-10, 10-11 have corresponding recesses and protrusions 10-81, 10-82 that provide a radial orientation for the rod elements 10-10, 10-11, particularly when they are telescoped. In addition, the first and the second rod element 10-10, 10-11 have corresponding snap-in features such as a snap-in hook 10-71 and a corresponding snap-in recess 10-72 within which the first and the second core element 10-10, 10-11 can be axially moved. The first and the second core element 10-10, 10-11 might be spring-loaded along the rotation axis 101 against each other for providing an engagement mechanism to the massage toy.

The rod 10 according to FIG. 7 allows for releasing the sleeve 10-2 either by disassembling the core elements 10-10 and 10-11 or by pulling the sleeve 10-2 over the top or the bottom portion of the core.

The massage toy 1 according to the invention provides a novel, compact and discrete massage toy for men and women.

The invention claimed is:

1. A massage toy (1) for stimulation of a sexual organ, the massage toy (1) comprising at least the following components:

A first toy member (11) of the massage toy (1), wherein the first toy member (11) comprises a first rod element (10) extending along a first rotation axis (101), wherein the first rod element (10) is arranged rotatably on the first rotation axis (101) comprising the first rotation axis;

A second toy member (21) of the massage toy (1), wherein the second toy member (21) comprises a second rod element (20) extending along a second rotation axis (102), wherein the second rod element (20) is arranged rotatably on the second rotation axis (102) comprising the second rotation axis;

A hinge assembly (2, 2*a*, 2*b*) that connects the first toy member (11) with the second toy member (21) such that the first and the second toy member (11, 21) can be swiveled around a swivel axis (100) of the hinge assembly (2, 2*a*, 2*b*), wherein the hinge assembly (2, 2*a*, 2*b*) is configured to adopt an adjustable swivel angle (300), such that a distance between the first rotation axis (101) and the second rotation axis (102) is adjustable by adjusting the swivel angle (300);

A motor assembly (5, 5*a*) configured to rotate the first rod element (10) around the first rotation axis (101) and to rotate the second rod element (20) around the second rotation axis (102).

2. Massage toy (1) according to claim 1, wherein a penetration opening (3) is formed between the first and the second rod element (10, 20), wherein the penetration opening (3) extends within a plane defined by the first and the second rotation axis (101, 102), wherein from said penetration opening (3) a penetration portion (3*a*) extends along a penetration axis (3*b*) that extends from the penetration opening (3) towards the swivel axis (100), wherein the penetration portion (3*a*) extends through the swivel axis (100), wherein the penetration portion (3*a*) is devoid of any rigid components.

3. Massage toy (1) according to claim 1, wherein the hinge assembly (2) comprises a first and a second hinge member (2*a*, 2*b*), wherein the first and the second hinge member (2*a*, 2*b*) are configured to adopt the adjustable swivel angle (300), and wherein the first hinge member (2*a*) is arranged at a top section (200) of the first and the second toy member (11, 21) and wherein the second hinge member (2*b*) is arranged on a bottom section (201) of the first and the second toy member (11, 21), particularly such that the penetration portion (3*a*) is devoid of the first and/or the second hinge member (2*a*, 2*b*).

4. Massage toy (1) according to claim 1, wherein the hinge assembly (2, 2*a*, 2*b*) comprises or is formed as an articulated bridge.

5. Massage toy (1) according to claim 1, wherein the swivel angle (300) of the hinge assembly (2, 2*a*, 2*b*) is adjustable between 30° and 330°.

6. Massage toy (1) according to claim 1, wherein the hinge assembly (2, 2*a*, 2*b*) is configured to adopt continuously variable swivel angles (300) for swivel angles (300) smaller than 180° and to adopt stepwise engaging swivel angles (300) for swivel angles (300) greater than 180°.

7. Massage toy (1) according to claim 1, wherein the motor assembly (5, 5*a*) comprises a first motor (5*a*) for rotating the first rod element (10) around the first rotation axis (101) and a second motor for rotating the second rod element (20) around the second rotation axis (102).

8. Massage toy (1) according to claim 7, wherein the motor assembly (5) comprises at least one stepper motor.

9. Massage toy (1) according to claim 1, wherein the motor assembly (5, 5*a*) is configured to rotate the first and the second rod element (10, 20) in a contra-rotating manner.

10. Massage toy according to claim 1, wherein the first and the second rod element (10, 20) are mounted on the respective rotation axis (101, 102) such that if a torque is applied to the first or the second rod element (10, 20) that is larger than a predefined or adjustable maximum torque, said first or second rod element (10, 20) disengages from the motor assembly (5, 5*a*) such that said first and/or second rod element (10, 20) are not rotatable by the motor assembly (5, 5*a*).

11. Massage toy (1) according to claim 1, wherein the first and the second rod element (10, 20) each have an outer surface (12, 22) surrounding the respective rotation axis (101, 102), wherein the outer surface (12, 22) of the first or the second rod element (10, 20) has an at least partially concave contour.

12. Massage toy (1) according to claim 1, wherein the first and the second toy member (11, 12) each comprise a catch-and-release mechanism that is configured to release the first and the second rod element (10, 20) from the first and second toy member (11, 21) and to catch the first and the second rod element (10, 20) in the first and the second toy member (11, 21), wherein the catch-and-release mechanism is configured to be operated manually.

13. Massage toy (1) according to claim 1, wherein the massage toy (1) comprises an electronic circuit (40) with a processor unit (41) and a memory (42), wherein the processor unit (41) is configured to control the motor assembly (5, 5*a*) for the rotation of the first and the second rod element (10, 20), particularly wherein the motor assembly (5, 5*a*) is controlled by the processor unit (41) according to a computer program with computer program code stored on the memory (42) that, when executed by the processor unit (41), provides the processor unit (41) with instructions causing the processor unit (41) to control the motor assembly (5, 5*a*) of the massage toy (1) such that the first and the second rod element (10, 20) perform a rotation pattern stored in the computer program.

14. System comprising the massage toy (1) according to claim 1 and a third rod element as well as a fourth rod element, wherein the first and the second rod element (10, 20) are exchangeable by the third and the fourth rod element, wherein the third rod element and the fourth rod element differ in at least one of the following properties from the first and second rod element:

a surface material composition;

an outer surface contour;

an elasticity of the rod element.

* * * * *